Figure 1:
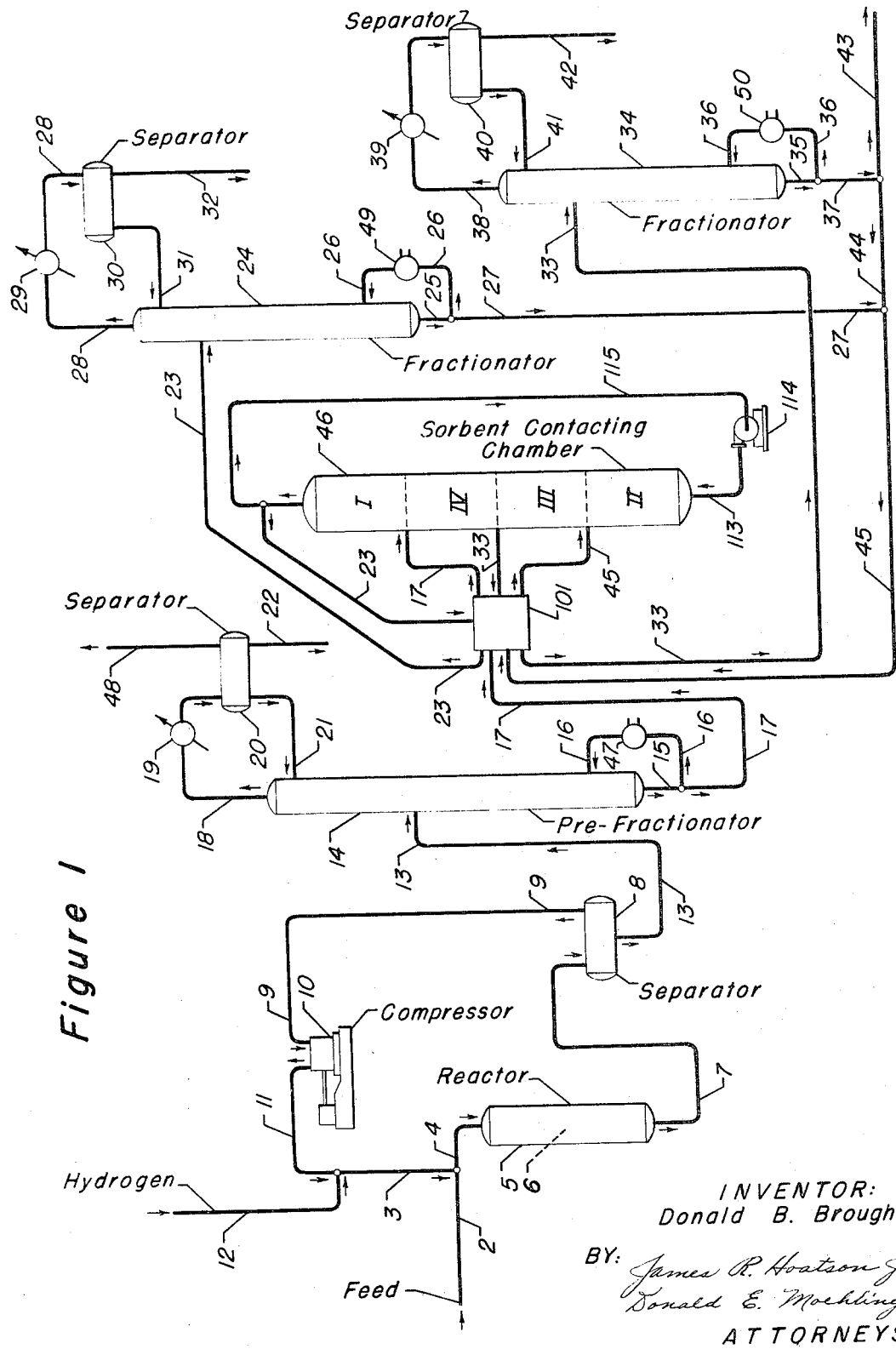

Dec. 13, 1966 D. B. BROUGHTON 3,291,726
CONTINUOUS SIMULATED COUNTERCURRENT SORPTION
PROCESS EMPLOYING DESORBENT
MADE IN SAID PROCESS
Filed May 4, 1964 3 Sheets-Sheet 1

INVENTOR:
Donald B. Broughton
BY: James R. Hoatson Jr.
Donald E. Moehling
ATTORNEYS Dec. 13, 1966  D. B. BROUGHTON  3,291,726
CONTINUOUS SIMULATED COUNTERCURRENT SORPTION
PROCESS EMPLOYING DESORBENT
MADE IN SAID PROCESS
Filed May 4, 1964  3 Sheets-Sheet 2

INVENTOR:
Donald B. Broughton

BY: James R. Hoalson Jr.
Donald E. Moehling
ATTORNEYS

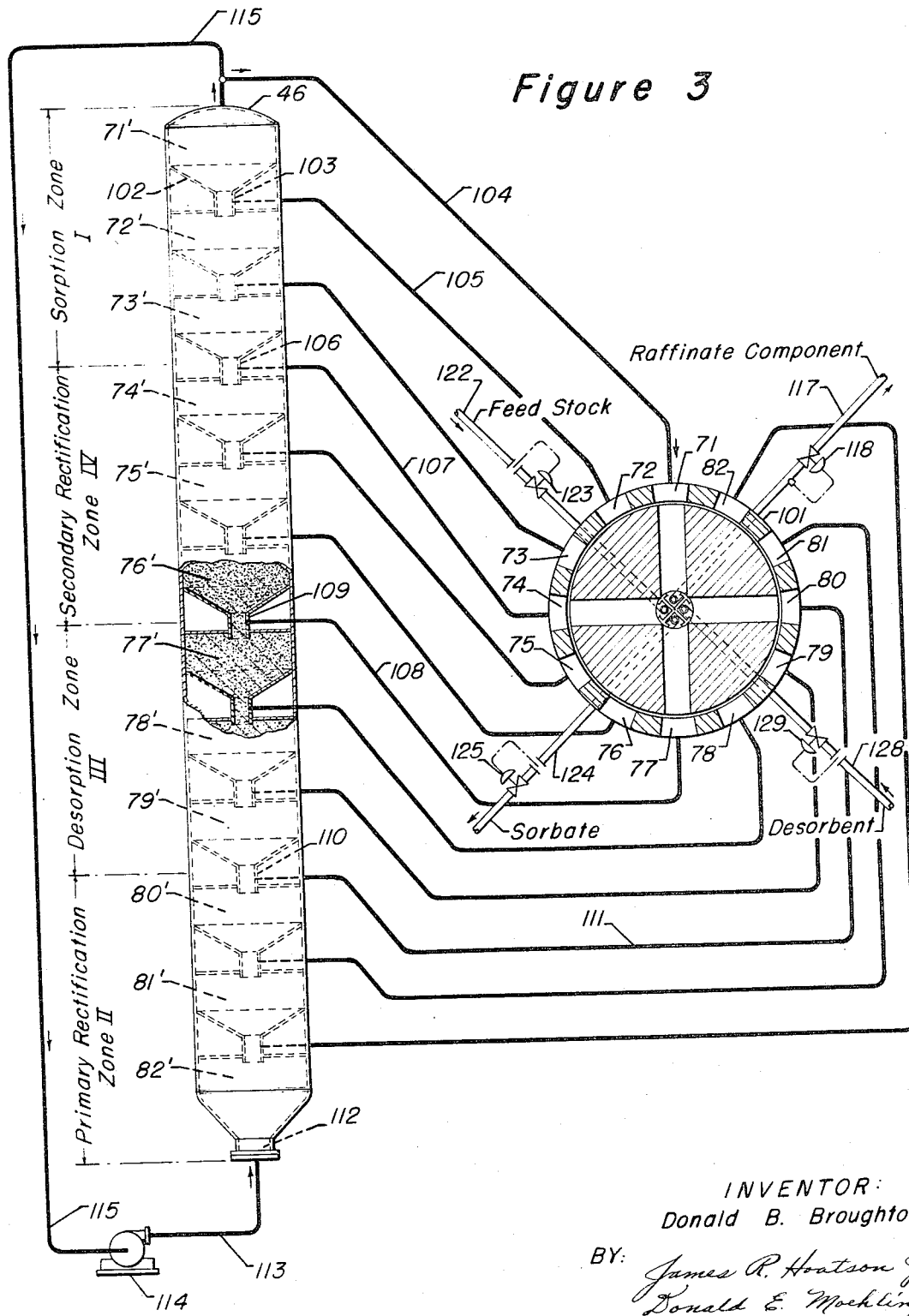

United States Patent Office 3,291,726
Patented Dec. 13, 1966

3,291,726
CONTINUOUS SIMULATED COUNTERCURRENT SORPTION PROCESS EMPLOYING DESORBENT MADE IN SAID PROCESS
Donald B. Broughton, Evanston, Ill., assignor to Universal Oil Products Company, Des Plaines, Ill., a corporation of Delaware
Filed May 4, 1964, Ser. No. 364,477
20 Claims. (Cl. 208—310)

This invention relates to a process for the separation of components of a fluid mixture and the production of a suitable desorbent. More particularly, this invention relates to a process for the separation of components of a fluid mixture, at least one of which is selectively sorbed by contact with a solid sorbent, said mixture including a fraction suitable for use as a desorbent which process comprises introducing said fluid mixture into contact with a bed of solid sorbent, withdrawing from said bed relatively less sorbed raffinate, separating said raffinate into a higher boiling fraction and a lower boiling fraction in a separator, returning one of said raffinate fractions as a desorbent to said bed thereby desorbing the previously sorbed component, withdrawing from said bed resulting sorbate comprising selectively sorbed component and desorbent, separating said sorbate into a higher boiling fraction and a lower boiling fraction in a second separator, returning a portion of one of said sorbate fractions as additional desorbent to said bed and withdrawing the remaining portion of said sorbate fraction from said second separator.

In one of its embodiments this invention relates to a continuous process for the separation of components of a fluid mixture, at least one of which is selectively sorbed by contact with a solid sorbent, said fluid mixture including a fraction suitable for use as a desorbent, which process comprises introducing said fluid mixture into a first zone of a fixed bed of said solid sorbent containing at least four serially interconnected zones having fluid flow connecting means between adjacent zones and between the outlet of one terminal zone and the inlet of the other terminal zone in the series to thereby provide cyclic fluid flow in said process, substantially simultaneously withdrawing relatively less sorbed raffinate from a second zone immediately downstream of said first zone, separating said raffinate into a higher boiling fraction and a lower boiling fraction in a first separator, returning one of said raffinate fractions as a desorbent to said fixed bed by substantially simultaneously introducing said raffinate fraction into a third zone immediately downstream of said second zone, substantially simultaneously withdrawing resulting sorbate comprising selectively sorbed component and desorbent from a fourth zone immediately downstream of said third zone, separating said sorbate into a higher boiling fraction and a lower boiling fraction in a second separator, returning a portion of one of said sorbate fractions as additional desorbent to said third zone and withdrawing the remaining portion of said sorbate fraction from said second separator, maintaining a continuously circulating stream of fluid flowing through said series of interconnected zones, and periodically advancing downstream the point in said fixed bed of introducing said fluid mixture while simultaneously and equally advancing downstream the point of introducing desorbent and withdrawing raffinate and desorbent.

In another of its embodiments this invention relates to a continuous process for the separation of components of a fluid mixture by contact with a selective solid sorbent and the production of a concentrate of a selectively sorbed component having a narrower temperature boiling range than said fluid mixture which process comprises the steps: introducing said fluid mixture into a first zone of a fixed bed of solid sorbent containing at least four serially interconnected zones having fluid flow connecting means between adjacent zones and between the outlet of one terminal zone and the inlet of the other terminal zone in the series to thereby provide cyclic fluid flow in said process, substantially simultaneously withdrawing relatively less sorbed raffinate from a second zone immediately downstream of said first zone, separating the raffinate into a higher boiling fraction and a lower boiling fraction in a fractionating column, rejecting one of said raffinate fraction, recycling the other of said raffinate fluid fractions to said fixed bed and substantially simultaneously introducing said other raffinate fraction into a third zone immediately downstream of said second zone, thereby desorbing the selectively sorbed component, substantially simultaneously withdrawing resulting sorbate comprising selectively sorbed component and a portion of said recycled other raffinate fraction from a fourth zone immediately downstream of said third zone, separating said sorbate into a higher boiling fraction and a lower boiling fraction in a second fractionating column, recycling a portion of one of said sorbate fluid fractions as additional desorbing fluid into said third zone, rejecting the remaining portion of said one sorbate fraction, and collecting the other sorbate fraction as the said produced concentrate, while maintaining a continuously circulating stream of fluid flowing through said series of interconnected zones in a positive downstream direction, and periodically advancing downstream the point in said fixed bed of introducing said fluid mixture while simultaneously and equally advancing downstream the point of introducing said recycled fluid and withdrawing raffinate and sorbate. The sorbate fraction which is not recycled is a concentrate of selectively sorbed component which has a narrower boiling range than said fluid mixture and is suitable for subsequent use as a desorbent for the separation of a second fluid mixture which is outside of the boiling range of said concentrate.

It is an object of this invention to provide a method for the separation of components of a fluid mixture by means of a selective solid sorbent without the use of an external desorbing fluid. It is another object of this invention to provide a method for the separation of components of a fluid mixture by means of a selective solid sorbent thereby producing a suitable desorbing fluid for a subsequent fluid mixture. It is a more specific object to provide a method for the separation of normal hydrocarbon molecules from a fluid hydrocarbon mixture by means of a solid sorbent selective for normal hydrocarbons and to provide suitable desorbing fluid from said fluid hydrocarbon mixture to release the selectively sorbed normal hydrocarbons. It is a still more specific object to provide a method for the production of a high purity normal hydrocarbon liquid of a narrow temperature boiling range from a fluid hydrocarbon mixture of a wide temperature boiling range in which said narrow boiling range falls within said wide boiling range. It is another more specific object to provide a method for the production of a high purity normal hydrocarbon liquid of a narrow molecular weight range from a fluid hydrocarbon mixture of a wide molecular weight range in which said narrow molecular weight range falls within said wide molecular weight range. It is a still more specific object of this invention to provide a method for the separation of a fluid hydrocarbon mixture into a high purity normal hydrocarbon mixture of an arrower molecular weight range than said fluid mixture, a high purity non-normal hydrocarbon mixture of a narrower molecular weight range than said fluid mixture and another mixture of a narrower molecular weight range than said fluid mixture having substantially the same normal purity as the fluid mixture has in the latter mentioned molecular weight range.

Normal molecules are defined to mean straight chain molecules such as normal butane, normal hexane, normal heptane, normal heptene, etc. The separation of normal molecules has been known for many years. There are solid sorbents which selectively occlude into the porous structure of said sorbent straight chain components of a fluid mixture but which do not permit entry into the pores of the sorbent non-straight chain components. The pores present in these sorbents are from 4 to 5 Angstroms in cross-sectional diameter which permits the entry of straight chain compounds such as normal hexane into the porous structure while excluding from said porous structure non-normal compounds such as 2,3-dimethyl butane, cyclohexane and benzene. An example of this type of sorbent is dehydrated metal aluminosilicate, the metallo constituent of which is selected from the alkali and alkaline earth metals. In order to provide a useful method for separation of normal from non-normal components, it is necessary to desorb the occluded normal compounds. This can be accomplished by means of other normal compounds, preferably of a different molecular weight than the occluded normal compounds. Therefore, a system is envisioned whereby a feed mixture of 2,3-dimethyl butane, cyclohexane and normal hexane is contacted with a sorbent selective for normal hexane. (This mixture is difficult to separate by fractional distillation.) It will be found that when the non-sorbed effluent or raffinate is withdrawn from the sorbent, it will be enriched in concentration of 2,3-dimethyl butane and cyclohexane. The sorbent now saturated with normal hexane is contacted with a desorbing fluid such as normal butane whereby a portion of the normal butane displaces the normal hexane leaving a liquid surrounding said sorbent enriched in normal hexane. Said liquid is withdrawn from the solid sorbent and thereupon more of said feed mixture is introduced into contact with the sorbent now saturated with normal butane. The normal hexane displaces the normal butane from the pores thereby leaving a liquid surrounding said sorbent enriched in normal butane, cyclohexane and 2,3-dimethyl butane. This latter liquid was previously described as raffinate and is withdrawn from the solid sorbent. This principle of separation may be properly multistaged to give a continuous separation process and is described further hereinafter.

It is desirable that the desorbing fluid (also called desorbent) be enriched in normal compounds since these normal compounds are the effective desorbing medium. It is one of the novel aspects of this invention to utilize a desorbent which is produced from a feed fluid mixture but which has an enriched normal concentration as compared to said feed fluid mixture. The arrangement of the separation equipment in the process results in the unusual effect of separating a narrow molecular weight range of normal hydrocarbons, using a desorbing fluid enriched in normal hydrocarbons of another but different molecular weight range, both said narrow and said different molecular weight ranges being included in the feed molecular weight range.

The separation of normal hydrocarbons from hydrocarbon mixtures using zeolitic molecular sieves has been known for a number of years. For example, a process for the separation of normal paraffins using molecular sieves is presented in U.S. Letters Patent No. 2,920,037, issued on June 5, 1960. Another example is shown in U.S. Letters Patent No. 2,957,927, issued on October 25, 1960. The concept of the use of moving inlets and outlets to simulate countercurrent flow of sorbent and feed using sorbents such as molecular sieves has also been known for several years. For example, such a process is disclosed in U.S. Letters Patent No. 2,985,589, issued on March 23, 1961. These processes employ the use of a separate desorbent which is generally outside of the molecular weight range of the feed stock employed. A certain small fraction of this permanent desorbent is inadvertently lost on each cycle of the adsorption-desorption process due to imperfect fractionation operations, etc. In order to avoid depletion of this separate desorbent, either large quantities must be placed in a surge system or outside supplies of suitable desorbent must be employed. Frequently, suitable desorbents are not readily available or else they are expensive.

Other methods have been employed in the reactivation of the sorbent such as methods in which the sorbed compounds are removed from the sorbent by heating the sorbent to a relatively high temperature. Another method employed has been to remove the sorbed component from the sorbent using reduced pressures during the desorption cycle.

Advantages of the present invention over conventional processes are that an outside desorbent is not necessary since the desorbing fluid comes from the feed and also that said desorbing fluid has a higher concentration of effective desorbing components than the feed has in the same molecular weight range.

One of the essential parts of the process is sorbent contacting chamber 46 shown in FIGURE 1. Said chamber is capable of having introduced to it continuously a feed mixture and a desorbing fluid while simultaneously having withdrawn a relatively less sorbed raffinate and a sorbate. Sorbent contacting chamber 46 represents any suitable apparatus comprising a series of fixed beds or, if desired, one single continuous bed for sorbent having fluid flow connecting means between the outlet of one bed and the inlet of its next adjacent bed and comprising suitable means, such as a valve or manifold, for shifting the points of inlet and outlet for the various feed and product streams involved in the process. FIGURE 3 illustrates one of the preferred contacting chamber designs being particularly suitable because of its compact arrangement of the series of fixed beds in adjacent relationship to each other. The series of fixed beds may be a number (at least four) of horizontally spaced, separate beds interconnected by a pipe between the bottom of one bed and the top of its upstream adjacent bed, or the beds may be stacked one upon another within a suitable vertical column as illustrated in FIGURE 3 herein referred to in its entirety as contacting chamber 46 containing suitably shaped partitioning means which divide the vertical column into a series of adjacent contacting beds such as beds 71 through 82, each bed being divided from its adjacent contacting beds (except the uppermost and lowermost beds) by a funnel-shaped partitioning member such as partition 102 located between beds 71' and 72' having upcomer 103 of restricted cross-sectional area opening from bed 72' into downstream subadjacent bed 71'.

An essential portion of this part of the process, essential, that is, to the realization of simulated countercurrent flow of solid and liquid, is the provision of a suitable programming device for changing the points of inlet and outlet into and from the contacting chamber, for advancing each of these points in a downstream direction during the operation of this part of the process. Any suitable form of fluid distribution center such as a manifold arrangement of valves and incoming and outgoing lines may be provided with timed, electrically operated switches to open and close appropriate valves. The programming principle may also be suitably effected by means of a plug valve of particular design such as that rotary valve described and claimed in U.S. Patent No. 3,040,777, issued June 26, 1962.

Valve 101, representing a suitable programming device, contains a number of fluid inlet and outlet ports, 71 through 82, which are connected to the contacting beds in chamber 46 by flow conduits such as 104, 105, 107, 108 and 111. As shown in FIGURE 3, the feed stock is introduced through flow conduit 122 through valve 101 which is positioned to send the feed stock through port 74 and flow conduit 107 and into upcomer 106 and finally into bed 73'. The rate of introduction of feed stock through flow conduit 122 is controlled by suitable flow control, for example, employing an orifice in flow conduit 122 causing a pressure drop across said orifice, and suitable detection equipment to detect the pressure drop, compare said pressure drop to a preselected pressure drop and having an error signal actuate control valve 123 thus achieving flow control. The sorbate is withdrawn from upcomer 109 through flow conduit 108 into port 77 and out flow conduit 124 under similar flow control as described above by means of control valve 125. The desorbent is introduced through flow conduit 128, through valve 101 wihch is positioned to send the desorbent through port 80 and flow conduit 111 into upcomer 110 and finally into bed 79′ under similar flow control as described above by means of control valve 129. The raffinate is withdrawn from flow conduit 104, through port 71, through valve 101 and out flow conduit 117. The rate of withdrawal of raffinate through flow conduit 117 is controlled by a suitable pressure control device such as an instrument which senses the pressure in chamber 46 and actuates control valve 118 to maintain a constant preselected pressure. A continuous stream of fluid is circulated from the chamber through flow conduit 115, through pump 114 and back into the chamber through flow conduit 113 thus maintaining fluid circulation through all the beds in the column.

Simulated countercurrent flow is achieved by periodically advancing downstream the point of introducing the feed stock and the desorbent while simultaneously and equally advancing downstream the point of withdrawal of raffinate and sorbate. This concept may be illustrated by reference to FIGURE 3. After a preselected time period the valve will rotate in such a manner that the feed stock enters chamber 46 between beds 72′ and 73′ since flow conduit 122 is now connected to port 73; sorbent is withdrawn between beds 75′ and 76′ since flow conduit 124 is now connected to port 76; desorbent is introduced between beds 78′ and 79′ since flow conduit 128 is now connected to port 79; and raffinate is withdrawn between beds 81′ and 82′ since flow conduit 117 is connected to port 82. This may be seen by referring to FIGURE 3 and imagining that the valve has rotated in a clockwise direction such that the inlets and outlets have been shifted downstream one bed. The continual shifting of the rotary valve will then accomplish the desired simulated countercurrent flow. This latter concept may be further illustrated using a relativity concept. Standing on the ground outside of chamber 46, it is clear to an observer that the sorbent does not move but is stationary. However, if the observer were placed inside chamber 46 and upon the solid sorbent, he would have the appearance of moving since the fluid in contact with the sorbent is continually changing. This equipment arrangement has the feature of making the sorbent behave as though it is moving.

The sorbent contacting chamber may also be visualized as being a series of four interconnected zones of a single fixed bed of solid sorbent having no actual line of demarcation between each of the zones other than the zone boundaries defined by the points of inlet and withdrawal for the various fluid streams. In either case, all the zones are defined from the points of inlet and withdrawal. The sorption zone I in FIGURE 3 is defined as the zone bounded between the feed stock inlet and the raffinate outlet; the primary rectification zone II in FIGURE 3, as the zone bounded between the raffinate outlet and the desorbent inlet; the desorption zone III in FIGURE 3, as the zone bounded between the desorbent inlet and the sorbate outlet; and the secondary rectification zone IV in FIGURE 3, as the zone bounded between the sorbate outlet and the feed stock inlet.

The sorbent contacting chamber is operated at conditions of temperature, pressure and under other process conditions which depend upon the particular feed stock involved, the particular sorbent utilized and the required purity of product. Although this chamber may be operated either in the liquid or vapor phase, in many cases it is preferable to operate in the liquid phase. In general, in liquid phase operations the pressure is less than when employing gaseous phase conditions, the latter being dependent upon, generally, the molecular weight of the feed stock components. Typical liquid phase operation is, for example, temperatures of the from 30° F. to 600° F., and more particularly 300° F. to 500° F., and pressures of from slightly superatmospheric to 30 atmospheres or higher depending primarily upon the feed stock. Generally higher pressures will be employed for lower molecular weight feed stocks to maintain liquid phase in the contacting chamber. In many cases is will be desirable to operate at conditions which will maintain the inlet and outlet fluids in the liquid phase but will maintain relatively lower viscosity to avoid excess pressure drop through the packed beds of sorbent as well as permit a more rapid rate of sorption and desorption. It is within the scope of the invention to utilize different temperatures in different zones of the fixed beds to take advantage of the rate of sorption and desorption due to differences in properties of the feed stock and the desorbent. This may be accomplished, for example by heating one of the inlet streams or by heating both but to different temperatures prior to entering the contacting chamber.

Suitable feed stocks would include any fluid mixture which contains at least one component which is capable of being sorbed by a selective sorbent. A particularly suitable feed stock would be an organic liquid containing components that are selectively sorbed by a sorbent. A hydrocarbon fluid mixture containing at least one normal components would be an especially preferable feed stock. Specific examples of hydrocarbon fluid mixtures would be a gasoline boiling range naphtha having an Engler distillation within the range of from 160° F. to 400° F., a kerosene, a distillate fuel having an Engler distillation end point up to approximately 700° F., and a lubricating oil having an Engler distillation within the range of from approximately 650° F. to 900° F.

This process may be employed to upgrade the octane number of naphthas by selectively removing the low octane normal compounds from the fluid mixture thus producing a fuel of enhanced octane number. This process can produce a concentrate of normal compounds either of a narrow or of a broad molecular weight which is useful as an intermediate in ultimately producing desirable products such as biodegradable detergents. Normal compounds also make efficient jet fuels. In the lubricating oil boiling range a concentrate of normal compounds is useful as a multi-viscosity lubricating oil. In this latter example it becomes unnecessary to add synthetic organic compounds to lubricating oils in order to achieve the desired multi-viscosity specifications. The synthetic organic compounds are undesirable in that they substantially add to the cost of the lubricating oil and are frequently unstable.

The maximum charge rate of feed stock through the fixed bed of solid sorbent is limited by the tolerable pressure drop through said fixed bed. The minimum charge rate of feed stock through said fixed bed is limited to a rate sufficient to avoid back mixing (i.e., to maintain substantially plug flow through said beds). These rates will be dependent upon the type of charge stock used and the conditions of pressure and temperature employed in the operation of the sorbent contacting chamber. It is convenient to use the concept of space velocity in defining the ratio of feed stock charge rate to quantity of sorbent. The term liquid hourly space velocity will be used herein and is defined as the charge rate of feed stock at conditions of 60° F. and one atmosphere in cubic feet per hour divided by the cubic feet of solid sorbent. It is expected that liquid hourly space velocities of from about 0.01 to about 1.0 will be employed depending upon the operating conditions of pressure and temperature, the feed stock and the equipment limitations.

Suitable sorbents would be any substance which can be produced in discrete particles within the size range of from about 10 to about 200 mesh and which have an appreciable degree of selectivity for at least one of the components of the fluid mixture to be separated. In the case of separating normal compounds from a mixture of normals and non-normals, dehydrated metal aluminosilicates comprise a suitable sorbent. These metal aluminosilicates have been commonly called molecular sieves. This material includes both synthetic and naturally occurring zeolites and is made of crystalline structures having many small cavities connected by still smaller pores of uniform size. These pores may vary in size from 3 Angstrom units up to 12 or 15 or even more. However, a particular molecular sieve material will desirably have uniform pore sizes. Zeolites vary somewhat in composition although they generally contain aluminum, silica, oxygen and an alkali and/or alkaline earth metal (i.e., sodium and/or calcium). To separate normal compounds, the pore size should be no larger than 5 Angstrom units. However, other size molecular sieve pores may be employed in different types of separations. Other sorbents which may be useful in this process may be selected from such materials as activated carbon, activated alumina, silica gel, adsorbent cotton, glass wool, various clays, fuller's earth, bone char, metal oxides, etc. depending upon the desired separation.

*Example I*

The process of this invention is typically illustrated in the following run which comprises a method for the production of a desorbent concentrate of at least 80% of a normal heptane-normal octane mixture (hereafter referred to as $nC_7-nC_8$) from a feed stock comprising a hydrogen-treated, straight run naphtha having an Engler distillation initial boiling point of approximately 180° F., a 50% boiling point of approximately 265° F., and an end boiling point of approximately 348° F. The feed stock may be further characterized as having an A.P.I. gravity of approximately 58°, a paraffin concentration of 63 volume percent, a naphthene concentration of 27 volume percent and an aromatic concentration of 10 volume percent. The following table illustrates an estimated detailed breakdown of said feed stock.

VOLUME PERCENT

| Carbon atoms per molecule | Total | Normal Paraffin | Non-normal Hydrocarbon |
| --- | --- | --- | --- |
| 6 | 6 | 1.68 | 4.32 |
| 7 | 20 | 5.60 | 14.40 |
| 8 | 23 | 6.44 | 16.56 |
| 9 | 21 | 5.88 | 15.12 |
| 10 | 20 | 5.60 | 14.40 |
| 11 | 10 | 2.80 | 7.20 |
| | 100 | 28.00 | 72.00 |

It is observed that there is 12.04 volume percent $nC_7-nC_8$ in said feed stock and the process of this invention is employed to produce a desorbent comprising 12 volume percent of the feed stock having at least an 80 volume percent concentration of $nC_7-nC_8$.

Said feed stock is introduced into a hydrogen-treating unit as is shown in FIGURE 1. The straight run naphtha is introduced through flow conduit 2 where it mixes with recycle gas which comprises hydrogen and at least one of the group consisting of methane, ethane, hydrogen sulfide and ammonia. The mixture then flows into hydrogen-treating reactor 5 wherein contaminants such as sulfur, nitrogen and olefins are reacted with hydrogen and trace metals are removed such that the reactor effluent is substantially free of organic, non-hydrocarbon contaminants. A preferable hydrogen-treating reactor comprises fixed bed of catalyst 6 which has an appreciable hydrogenation and cracking activity. Wide ranges in operating conditions of the hydrogen-treating reactor are possible although preferable ranges comprise pressures of from 1500 to 400 p.s.i.g., liquid hourly space velocities of from 1 to 10, temperatures of from 500° F. to 900° F. and gas to oil mole ratios of from 0.5 to 20. The selection of these operating conditions is dependent upon the type of charge stock, equipment limitations and overall economy of operation.

The reactor effluent is withdrawn out of reactor 5 and enters high pressure separator 8 through flow conduit 7. Normally gaseous products at the separator operating conditions are withdrawn through flow conduit 9 where they may be removed from the system or recycled back to the hydrogen-treating reactor by means of recycle compressor 10 and flow conduit 11. Since the reactions in the hydrogen-treating reactor consume hydrogen, additional hydrogen is introduced through flow conduit 12. Normally liquid products and dissolved gases are withdrawn through flow conduit 13 and into prefractionator 14. Since it is desired to obtain an $nC_7-nC_8$ product, the prefractionator is operated to separate two fractions, the overhead comprising compounds having less than 7 carbon atoms per molecule and a bottoms comprising compounds having more than 6 carbon atoms per molecule. Said overhead is withdrawn through flow conduit 18, through cooler 19 and into separator 20. The normally gaseous portion at the separator operating conditions is withdrawn through flow conduit 48 and comprises at least one of the group consisting of hydrogen, hydrogen sulfide, methane, ethane, propane, butane or ammonia. The normally liquid portion of said overhead is partly withdrawn through flow conduit 22 and partly recycled back to prefractionator 14 through flow conduit 21. The bottoms is withdrawn from prefractionator 14 through flow conduit 15 whereupon a portion of the bottoms flows through flow conduit 16, through reboiler heater 47 and back into prefractionator 14. The remaining bottoms portion flows through flow conduit 17 and comprises the feed to sorbent contacting chamber 46.

Relatively less sorbed raffinate is withdrawn from said chamber 46 through flow conduit 23 and enters raffinate fractionator 24. Since it is desired to obtain an $nC_7-nC_8$ product, the raffinate fractionator is operated to separate two fractions, an overhead comprising compounds containing more than 6 carbon atoms per molecule and less than 9 carbon atoms per molecule and a bottoms comprising compounds containing more than 8 carbon atoms per molecule. Due to the adsorptive-desorptive action in chamber 46, the raffinate overhead will be enriched in non-normal compounds. The overhead is withdrawn from said raffinate fractionator 24 in flow conduit 28, through cooler 29 and into separator 30. A portion of said raffinate overhead is recycled to fractionator 24 as reflux through flow conduit 31 and the remaining portion of said raffinate overhead is withdrawn through flow conduit 32.

The raffinate bottoms is withdrawn from fractionator 24 through flow conduit 25 where a portion of said raffinate bottoms flow through flow conduit 26, reboiler heater 49 and returns to fractionator 24. The remaining portion of said raffinate bottoms flows through flow conduits 27 and 45 and returns to chamber 46 as desorbing fluid. The bottoms comprises compounds containing more than 8 carbon atoms per molecule and is enriched in normal compounds. Thus, the raffinate column produces an overhead enriched in non-normal compounds and a bottoms enriched in normal compounds. Since the raffinate bottoms is enriched in normal compounds, said raffinate bottoms will be a more efficient desorbing fluid, for the normal compounds are a preferable desorbing fluid.

The desorbing fluid displaces the selectively sorbed sorbate from the solid sorbent in zone III of chamber 46. Said sorbate is withdrawn through flow conduit 33 and enters sorbate fractionator 34. The sorbate fractionator is operated to separate two fractions, an overhead comprising compounds containing more than 6 carbon atoms per molecule and less than 9 carbon atoms per molecule and a bottoms comprising compounds containing more than 8 carbon atoms per molecule. Due to the adsorptive-desorptive action in chamber 46, the sorbate overhead will be enriched in normal compounds thus resulting in the desired product. The overhead is withdrawn from said sorbate fractionator 34 through flow conduit 38, cooler 39 and into separator 40. A portion of said sorbate overhead is recycled to fractionator 34 as reflux through flow conduit 41 and the remaining portion of said sorbate overhead is withdrawn through flow conduit 42 as the desired $nC_7$–$nC_8$ product.

The sorbate bottoms is withdrawn from fractionator 34 through flow conduit 35 where a portion of said sorbate bottoms flows through flow conduit 36, reboiler heater 50 and returns to fractionator 34. The remaining portion of said sorbate bottoms is split into two fractions, one of which is returned to chamber 46 through flow conduits 37, 44 and 45 as additional desorbing fluid and the other of which is withdrawn from the system through flow conduits 37 and 43. The sorbate bottoms comprises compounds containing more than 8 carbon atoms per molecule and have the same concentration of normals and non-normals as is present in the original feed to chamber 46 in flow conduit 17. As the rate of sorbate bottoms recycle is increased in flow conduit 44, the total flow of normal desorbing fluid increases but at a slower rate than does the rate of increase of non-normal desorbing fluid. This means that the concentration of normals in flow conduit 45 decreases as the rate of sorbate bottoms recycle increases in line 44 but the total amount of normals returning as desorbing fluid increases.

Using the above equipment arrangement, 5,000 barrels per day (b./d.) of said feed stock is introduced in flow conduit 2. Eighty-four b./d. of normal hexane and 216 b./d. of non-normal 6 carbon atom molecules are withdrawn as net prefractionator overhead through flow conduit 22. Six hundred and two b./d. of normal heptane and normal octane, 1,548 b./d. of non-normal 7 and 8 carbon atom molecules, 714 b./d. of normal molecules having more than 8 carbon atoms per molecule and 1,836 b./d. of non-normal molecules having more than 8 carbon atoms per molecule are withdrawn as prefractionator bottoms and charged through flow conduit 17 into chamber 46. One hundred and twenty-one b./d. of normal heptane and normal octane, 1,428 b./d. of non-normal 7 and 8 carbon atom molecules, 1,229 b./d. of normal molecules having more than 8 carbon atoms per molecule and 1,964 b./d. of non-normal molecules having more than 8 carbon atoms per molecule are withdrawn through flow conduit 23 as relatively less sorbed raffinate and charged to raffinate fractionator 24. One hundred and twenty-one b./d. of normal heptane and normal octane and 1,428 b./d. of non-normal 7 and 8 carbon atom molecules are withdrawn through flow conduit 32 as net raffinate overhead. One thousand two hundred and twenty-nine b./d. of normal molecules having more than 8 carbon atoms per molecule and 1,964 b./d. of non-normal molecules having more than 8 carbon atoms per molecule are recycled to chamber 46 by flowing through conduit 27 as a portion of the desorbing fluid.

Four hundred and eighty-one b./d. of normal heptane and normal octane, 120 b./d. of non-normal 7 and 8 carbon atom molecules, 2,649 b./d. of normal molecules having more than 8 carbon atoms per molecule and 6,807 b./d. of non-normal molecules having more than 8 carbon atoms per molecule are withdrawn through flow conduit 33 as sorbate and charged to sorbate fractionator 34. Four hundred and eighty-one b./d. of normal heptane and normal octane and 120 b./d. of non-normal 7 and 8 carbon atom molecules are withdrawn through flow conduit 42 as the net desired 80% normal purity heptane and octane product. Two thousand six hundred and forty-nine b./d. of normal molecules having more than 8 carbon atoms per molecule and 6,807 b./d. of non-normal molecules having more than 8 carbon atoms per molecule are withdrawn as net sorbate bottoms through flow conduit 37 of which 714 b./d. of normal molecules having more than 8 carbon atoms per molecule and 1,836 b./d. of non-normal molecules having more than 8 carbon atoms per molecule are withdrawn from the system through flow conduit 43. The remaining 1,935 b./d. of normal molecules having more than 8 carbon atoms per molecule and 4,971 b./d. of non-normal molecules having more than 8 carbon atoms per molecule are returned to chamber 46 as the other portion of said desorbing fluid. The total desorbing fluid flowing through flow conduit 45 is 3,164 b./d. of normal molecules having more than 8 carbon atoms per molecule and 6,935 b./d. of non-normal molecules having more than 8 carbon atoms per molecule.

*Example II*

Figure 2:
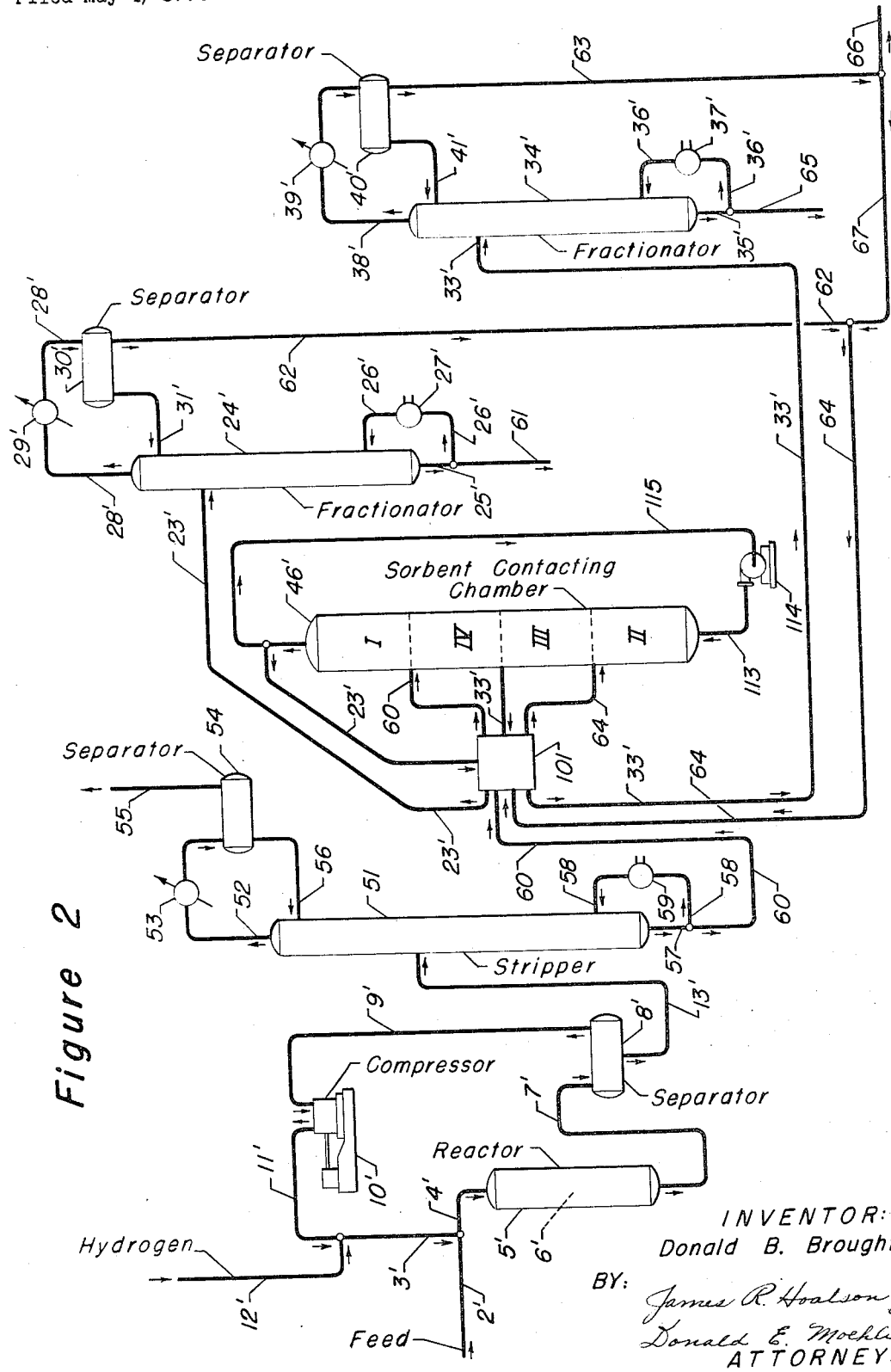

The process of this invention is further illustrated in another run which comprises a method for the separation of at least 80% purity normal hydrocarbons from a feed mixture of normal hydrocarbons and at least one of the group consisting of iso-paraffins, naphthenes and aromatics by contact with a sorbent selective for normal hydrocarbons in which a desorbent is produced from said feed mixture. The same charge stock is used as described in Example I but the equipment is arranged as shown in FIGURE 2. Where the equipment is the same as in FIGURE 1, a superscript of the same number as is used in FIGURE 1 is employed in FIGURE 2. The operation is identical until the reactor effluent leaves the hydrogen-treating separator through flow conduit 13′. The fluid enters a fractionator which is operated as a stripper to remove light gases, contaminants and hydrocarbons having less than six carbon atoms per molecule. Stripper 51 is operated to provide enough normally liquid overhead product to supply sufficient reflux in flow conduit 56 but not to produce any net overhead liquid. The sorbent contacting chamber 46′ is the same as described in Example I. There again is a raffinate fractionator 24′ and a sorbate fractionator 34′. However, the recycle flow conduits are arranged differently than set forth in Example I since now the overhead fluids are recycled instead of the bottom fluids.

The net raffinate overhead fluid is withdrawn from separator 30′ through flow conduit 62, through flow conduit 64 and returns to chamber 46′ as desorbing fluid. The net sorbate overhead fluid is withdrawn from separator 40′ through flow conduit 63 where a portion of said sorbate overhead is recycled to chamber 46′ by flowing through flow conduit 67 and 64 and the remaining portion of said sorbate overhead is withdrawn from the system through flow conduit 66.

In this example it is desired to produce a high purity concentrate of normal hydrocarbons having more than 6 carbon atoms per molecule. Recovery of hydrocarbons having less than 7 carbon atoms per molecule as an unseparated mixture will be satisfactory.

The same feed stock as shown in Example I is introduced in flow conduit 2′ at a rate of 5,000 b./d. where it flows through the hydrogen-treating reactor 5′ under hydrogenation and cracking conditions described in Example I. The reactor effluent is withdrawn from reactor 5′, through flow conduit 7′, into separator 8′, where the non-condensable gases are removed from the liquid, into flow conduit 13′ and finally into stripper 51. The stripper is operated at conditions to remove dissolved contaminant gases such as hydrogen sulfide and also light hydrocarbon gases such as methane, ethane, propane, etc. from the normally liquid feed stock. Liquid bottoms is withdrawn from stripper 51 through flow conduit 57 where a portion flows to sorbent contacting chamber 46′ through flow conduit 60 at a rate of substantially 5,000 b./d. Eighty-four b./d. of normal hexane, 216 b./d. of non-normal 6 carbon atom molecules, 1,316 b./d. of normal molecules having more than 6 carbon atoms per molecule and 3,384 b./d. of non-normal molecules having more than 6 carbon atoms per molecule are introduced into zone I of chamber 46'.

One thousand b./d. of normal hexane, 616 b./d. of non-normal 6 carbon atom molecules, 260 b./d. of normal molecules having more than 6 carbon atoms per molecule and 3,174 b./d. of non-normal molecules having more than 6 carbon atoms per molecule are withdrawn through flow conduit 23' as relatively less sorbed raffinate and charged to raffinate fractionator 24'. Two hundred and sixty b./d. of normal molecules having more than 6 carbon atoms per molecule and 3,174 b./d. of non-normal molecules having more than 6 carbon atoms per molecule are withdrawn through flow conduit 61 as net raffinate bottoms product. One thousand b./d. of normal hexane and 616 b./d. of non-normal 6 carbon atom molecules are recycled to chamber 46' by flowing through conduits 62 and 64 as a portion of the desorbing fluid.

Three thousand eight hundred and thirty b./d. of normal hexane, 9,854 b./d. of non-normal 6 carbon atom molecules, 1,056 b./d. of normal molecules having more than 6 carbon atoms per molecule and 210 b./d. of non-normal molecules having more than 6 carbon atoms per molecule are withdrawn through flow conduit 33' as sorbate and charged to sorbate fractionator 34'. One thousand and fifty-six b./d. of normal molecules having more than 6 carbon atoms per molecule and 210 b./d. of non-normal molecules having more than 6 carbon atoms per molecule are withdrawn through low conduit 65 as net sorbate bottoms product. Three thousand eight hundred and thirty b./d. of normal hexane and 9,854 b./d. of non-normal 6 carbon atom molecules are withdrawn as sorbate overhead of which 84 b./d. of normal hexane and 216 b./d. of non-normal 6 carbon atom molecules are withdrawn from the system as net 6 carbon atom product. The remaining 3,746 b./d. of normal hexane and 9,638 b./d. of non-normal 6 carbon atom molecules are returned to chamber 46' as the other portion of said desorbing fluid. The total desorbing fluid flowing through flow conduit 64 is 4,746 b./d. of normal hexane and 10,254 b./d. of non-normal 6 carbon atom molecules.

It should be noted in Example I that the desorbing fluid contains 3,164 b./d. of normal molecules out of 10,099 b./d. of total desorbing fluid having more than 8 carbon atoms per molecule which gives a 31.4 volume percent normal purity. The feed stock contains 714 b./d. of normal molecules out of 2,550 b./d. of total feed having more than 8 carbon atoms per molecule which gives a 28.0 volume percent normal purity. Thus, the desorbing fluid has an enhanced normal purity in the same molecular weight range as the feed stock and this desorbing fluid is produced from said feed stock. Likewise, in Example II the feed stock contains 84 b./d. of normal hexane out of 300 b./d. of 6 carbon atom molecules, therefore having a normal purity of 28 volume percent while the desorbing fluid contains 4,746 b./d. of normal hexane out of 15,000 b./d. of total desorbing fluid, therefore having a normal purity of 31.4 volume percent.

I claim as my invention:

1. A process for the separation of components of a fluid mixture, at least one of which is selectively sorbed by contact with a solid sorbent, said mixture including a fraction suitable for use as a desorbent which process comprises:

introducing said fluid mixture into contact with a bed of solid sorbent, withdrawing from said bed relatively less sorbed raffinate, separating said raffinate into a higher boiling fraction and a lower boiling fraction in a separator, returning one of said raffinate fractions as a desorbent to said bed thereby desorbing the previously sorbed component, withdrawing from said bed resulting sorbate comprising selectively sorbed component and desorbent, separating said sorbate into a higher boiling fraction and a lower boiling fraction in a second separator.

returning a portion of one of said sorbate fractions as additional desorbent to said bed, and withdrawing the remaining portion of said sorbate fraction from said second separator.

2. A process for the separation of components of a fluid mixture, at least one of which is selectively sorbed by contact with a solid sorbent, said fluid mixture including a fraction suitable for use as a desorbent, which process comprises:

introducing said fluid mixture into a first zone of a fixed bed of said solid sorbent containing at least four serially interconnected zones having fluid flow connecting means between adjacent zones and between the outlet of one terminal zone and the inlet of the other terminal zone in the series to thereby provide cyclic, fluid flow in said process, substantially simultaneously withdrawing relatively less sorbed raffinate from a second zone immediately downstream of said first zone, separating said raffinate into a higher boiling fraction and a lower boiling fraction in a first separator, returning one of said raffinate fractions as a desorbent to said fixed bed by substantially simultaneously introducing said raffinate fraction into a third zone immediately downstream of said second zone, substantially simultaneously withdrawing resulting sorbate comprising selectively sorbed component and desorbent from a fourth zone immediately downstream of said third zone, separating said sorbate into a higher boiling fraction and a lower boiling fraction in a second separator, returning a portion of one of said sorbate fractions as additional desorbent to said third zone and withdrawing the remaining portion of said sorbate fraction from said second separator, maintaining a continuously circulating stream of fluid flowing through said series of interconnected zones, and periodically advancing downstream the point in said fixed bed of introducing said fluid mixture while simultaneously and equally advancing downstream the point of introducing desorbent and withdrawing raffinate and sorbate.

3. The process of claim 2 further characterized in that the first zone is immediately downstream of the fourth zone.

4. The process of claim 2 further characterized in that the desorbent is produced from the fresh feed fluid mixture.

5. The process of claim 2 further characterized in that the first separator and the second separator are fractional distillation towers.

6. A continuous process for the separation of components of a fluid mixture by contact with solid sorbent selective for at least one of said components and the production of desorbent from said fluid mixture which process comprises:

introducing said fluid mixture into a first zone of a fixed bed of solid sorbent containing at least four serially interconnected zones having fluid flow connecting means between adjacent zones and between the outlet of one terminal zone and the inlet of the other terminal zone in the series to thereby provide cyclic, fluid flow in said process, substantially simultaneously withdrawing relatively less sorbed raffinate from a second zone immediately downstream of said first zone, separating the raffinate into a higher boiling fraction and a lower boiling fraction in a fractionating column, recycling one of said raffinate fractions as a desorbent to said fixed bed by substantially simultaneously introducing said raffinate fraction into a third zone immediately downstream of said second zone thereby desorbing selectively sorbed component, substantially simultaneously withdrawing resulting sorbate comprising selectively sorbed component and desorbent from a fourth zone immediately downstream of said third zone, separating said sorbate into a higher boiling fraction and a lower boiling fraction in a second fractionating column, recycling a portion of one of said sorbate fractions as additional desorbent to said third zone and withdrawing the remaining portion of said sorbate fraction from second fractionating column, maintaining a continuously circulating stream of fluid flowing through said series of interconnected zones in a positive downstream direction, and periodically advancing downstream the point in said fixed bed of introducing said fluid mixture while simultaneously and equally advancing downstream the point of introducing desorbent and withdrawing raffinate and sorbate.

7. The process of claim 6 further characterized in that the fraction of the raffinate that is recycled is the lower boiling fraction and the portion of the fraction of the sorbate that is recycled is the lower boiling fraction.

8. The process of claim 6 further characterized in that the fraction of the raffinate that is recycled is the higher boiling fraction and the portion of the fraction of the sorbate that is recycled is the higher boiling fraction.

9. The process of claim 6 further characterized in that the fluid mixture is an organic liquid.

10. The process of claim 6 further characterized in that the fluid mixture is a hydrocarbon liquid.

11. The process of claim 10 further characterized in that the hydrocarbon liquid comprises a normal aliphatic hydrocarbon as the selectively sorbed component and at least one hydrocarbon selected from the group consisting of branched chain aliphatic hydrocarbon, and cyclic hydrocarbons as the other component relatively less sorbed by the sorbent.

12. The process of claim 11 further characterized in that said normal aliphatic hydrocarbon is a parraffin.

13. The process of claim 6 further characterized in that the sorbent is a dehydrated metal aluminosilicate hydrate.

14. The process of claim 13 further characterized in that the size of the pores of the dehydrated metal aluminosilicate hydrate are of such size as to permit the sorption of a straight chain aliphatic hydrocarbon while rejecting non-straight chain hydrocarbons.

15. The process of claim 2 further characterized in that each of said zones comprises at least one fixed bed of said solid sorbent separated from a bed adjacent thereto by a fluid conduit of restricted cross section.

16. The process of claim 2 further characterized in that said zones are contained in a single fixed bed of solid sorbent, the boundaries of said zones being defined by the fluid inlets and outlets into and from said bed.

17. A process for the production of desorbent from a fluid mixture in which said desorbent is selectively sorbed by contact with a solid sorbent, said process comprising the steps:

introducing said fluid mixture into a first zone of a fixed bed of solid sorbent containing at least four serially interconnected zones having fluid flow connecting means between adjacent zones and between the outlet of one terminal zone and the inlet of the other terminal zone in the series to thereby provide cyclic fluid flow in said process, substantially simultaneously withdrawing relatively less sorbed raffinate from a second zone immediately downstream of said first zone, separating the raffinate into a higher boiling fraction and a lower boiling fraction in a fractionating column, rejecting one of said raffinate fractions, recycling the other of said raffinate fluid fractions to said fixed bed and substantially simultaneously introducing said other raffinate fraction into a third zone immediately downstream of said second zone, thereby desorbing the selectively sorbed said desorbent, substantially simultaneously withdrawing resulting sorbate comprising selectively sorbed said desorbent and a portion of said recycled other raffinate fraction from a fourth zone immediately downstream of said third zone, separating said sorbate into a higher boiling fraction and a lower boiling fraction in a second fractionating column, recycling a portion of one of said sorbate fluid fractions as additional desorbing fluid into said third zone, rejecting the remaining portion of said one sorbate fraction, and collecting the other sorbate fraction as the said produced desorbent, while maintaining a continuously circulating stream of fluid flowing through said series of interconnected zones in a positive downstream direction, and periodically advancing downstream the point in said fixed bed of introducing said fluid mixture while simultaneously and equally advancing downstream the point of introducing said recycled fluid and withdrawing raffinate and sorbate.

18. The process of claim 17 further characterized in that said recycled raffinate fluid fraction is the lower boiling fraction, the portion of said recycled sorbate fluid fraction is the lower boiling fraction and the said produced desorbent is the higher boiling fraction of the sorbate.

19. The process of claim 17 further characterized in that said recycled raffinate fluid fraction is the higher boiling fraction, the portion of said recycled sorbate fluid fraction is the higher boiling fraction and the said produced desorbent is the lower boiling fraction of the sorbate.

20. The process of claim 6 further characterized in that the zone into which the fluid mixture is introduced is at a different temperature than the zone in which the desorbent is introduced.

References Cited by the Examiner

UNITED STATES PATENTS

| | | | |
|---|---|---|---|
| 2,921,026 | 1/1960 | Fleck et al. | 208—310 |
| 2,974,179 | 3/1961 | Fleck et al. | 208—310 X |
| 3,001,927 | 9/1961 | Gerhold et al. | 208—310 X |
| 3,054,838 | 9/1962 | Egan | 208—310 X |

ALPHONSO D. SULLIVAN, *Primary Examiner*